United States Patent [19]

Coldren

[11] 4,141,301
[45] Feb. 27, 1979

[54] CULTIVATOR AND LIQUID FERTILIZER BLADE

[75] Inventor: Kenneth M. Coldren, Fort Wayne, Ind.

[73] Assignee: M & W Gear Company, Gibson City, Ill.

[21] Appl. No.: 749,071

[22] Filed: Dec. 9, 1976

[51] Int. Cl.² ............................................. A01C 23/02
[52] U.S. Cl. ...................................... 111/7; 172/699; 172/724; 172/730
[58] Field of Search ................. 111/7, 6, 86; 172/699, 172/700, 724, 730, 762, 763

[56] References Cited

U.S. PATENT DOCUMENTS

| 709,147 | 9/1902 | Fay | 172/730 |
|---|---|---|---|
| 1,381,028 | 6/1921 | Stevenson | 172/724 |
| 2,439,743 | 4/1948 | McEwen | 111/7 |
| 2,768,591 | 10/1956 | James | 111/7 |
| 2,842,077 | 7/1958 | Morrison | 111/7 |
| 2,904,119 | 9/1959 | Hunter | 172/762 |
| 2,924,187 | 2/1960 | Zimmerman | 111/7 |
| 3,605,657 | 9/1971 | Brannan | 111/7 |
| 3,618,538 | 11/1971 | Brannan | 111/7 |
| 3,745,944 | 7/1973 | Yetter et al. | 111/7 |
| 3,919,951 | 11/1975 | Williams et al. | 111/7 |

FOREIGN PATENT DOCUMENTS

| 2355802 | 5/1975 | Fed. Rep. of Germany | 172/700 |
|---|---|---|---|
| 679726 | 1/1965 | Italy | 172/700 |
| 506338 | 1/1976 | U.S.S.R. | 172/700 |

OTHER PUBLICATIONS

Anon., (1972) AMCO Deep Tillage Plow, (Advertizing Leaflet) by AMCO, No. 1, AMCO Drive/Yazoo City, Miss. 39194.

*Primary Examiner*—Edgar S. Burr
*Assistant Examiner*—James R. Feyrer
*Attorney, Agent, or Firm*—Allegretti, Newitt, Witcoff & McAndrews

[57] ABSTRACT

An improved fertilizer knife includes a main knife-shaped blade which is inclined in a forward direction and which has a fertilizer discharge tube along its trailing edge for discharge of liquid fertilizer into the soil. A pair of wings attached to the main blade extend transversely. The wings lie in a plane generally parallel to the soil surface. The wings are swept back and include optional tip members.

4 Claims, 4 Drawing Figures

CULTIVATOR AND LIQUID FERTILIZER BLADE

BACKGROUND OF THE INVENTION

The present invention relates to an improved fertilizer knife, and more particularly to a fertilizer knife for cultivating soil while simultaneously discharging liquid fertilizer material into the soil.

Many plowing operations, cultivating operations and fertilizing operations are carried on nowadays by use of a plow generally designated as a fertilizer knife or chisel plow. Depending upon soil conditions, various knives or plow types have proven to be satisfactory for tilling soil and applying fertilizer.

Typically a knife or blade is attached to a plow shank which is, in turn, attached to a plow bar. As the plow bar is pulled across a field by a tractor or similar means, the shank directs the blade member into the soil to work the soil and, when appropriate, cause liquid fertilizer or the like to be discharged through an appropriate tube attached to the blade. Typical of the various blades or blade constructions available are those made by Wiese Corporation, Perry, Iowa, and designated as their Model Nos. A-50, CP-65, DT-1. Plows of this nature may be utilized with various devices called "underground sealers" such as Wiese product No. AS-75 and AS-80. Numerous other companies make plow constructions similar in nature to those previously described.

Prior art devices, however, tend to clog or plug as they are drawn through the soil. This reduces their efficiency and often prevents desired distribution of fertilizer. Additionally, prior art constructions do not necessarily provide the dual functions of plowing and fertilizing. To accomplish these and other objectives, the present invention was developed.

SUMMARY OF THE INVENTION

In a principal aspect, the present invention comprises an improved cultivator and liquid fertilizer knife construction. The knife construction includes a main knife blade which is designed to project forwardly into the soil. A pair of transverse wings are attached to the main knife blade and extend outwardly the width of the blades from tip to tip being preferably in the range of about fifteen times the thickness of the main knife blade. The wings are also swept back. A fertilizer applicator tube is attached to the trailing edge of the main knife blade.

Thus, it is an object of the present invention to provide an improved combination cultivator and fertilizer applicator knife.

Another object of the present invention is to provide a cultivator and fertilizer applicator knife which does not tend to clog with the soil.

Still another object of the present invention is to provide a combination cultivator and fertilizer applicator knife which may be mounted on a single shank.

Still another object of the present invention is to provide a knife which is economical to manufacture, easy to repair, and has a long service life.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Referring to the figures, there is illustrated a fertilizer and cultivator knife construction incorporating the features of the present invention. A main blade 10 is fashioned from one-half inch thick sheet steel. The main blade 10 includes a leading edge 12 which, in the example shown and illustrated, is a flat leading edge and is not formed in any particular flat or beveled shape. A trailing edge 14 of similar shape is provided at opposite the leading edge 12. A lower edge 16 defines the depth of extension of the blade 10 into the ground during a plowing operation.

Figures 2, 2A, 3:
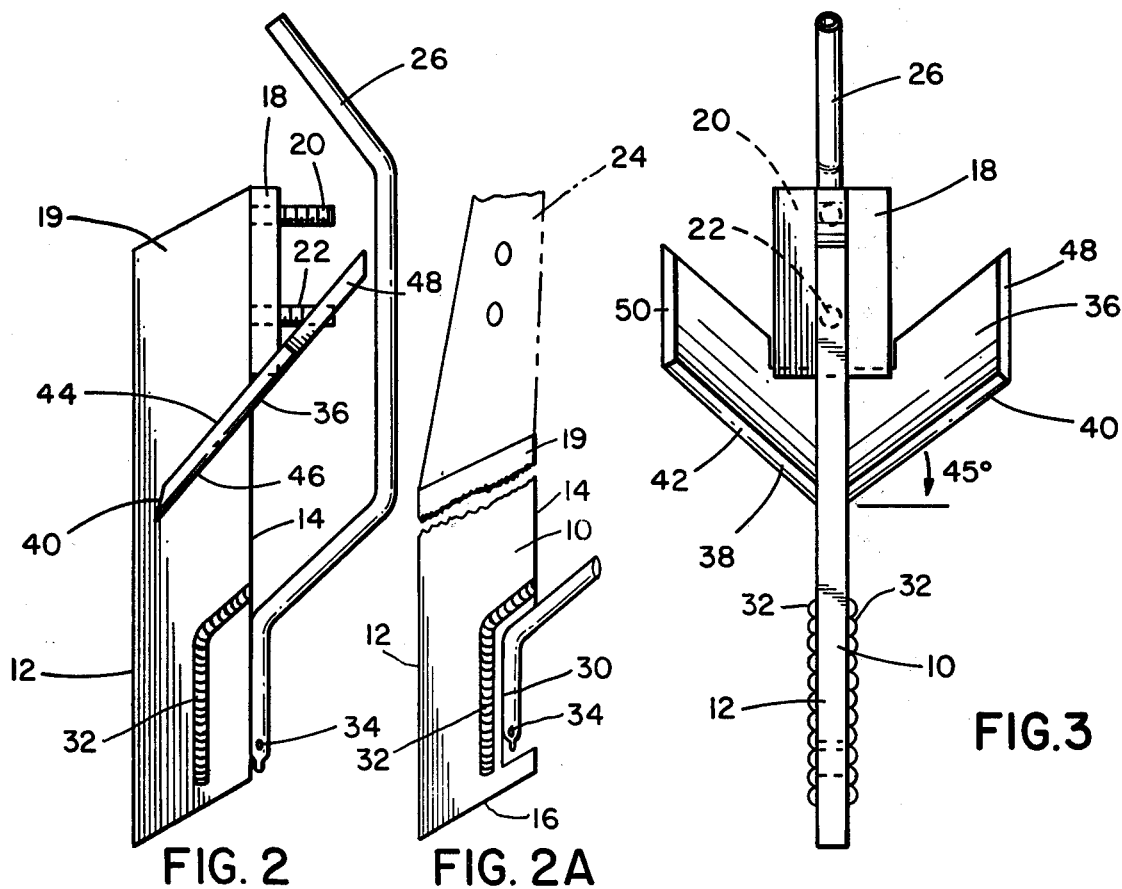
FIG. 2 is a top plan view of the structure of FIG. 1.
FIG. 2A is an enlarged plan view of an alternative construction for the fertilizer tube, similar to that shown in FIG. 2.
FIG. 3 is a side view of the structure of FIG. 2.

Main blade 10 includes a mounting plate 18 attached transverse thereto at the upper end 19 of the blade 10. Bolts 20 and 22 project from the mounting plate 18 and are utilized to couple the knife construction with an appropriate shank suspended from a tool bar. The upper end 19 of the main blade 10 may be extended as shown in FIG. 2A to define an attachment member 24. In any event, the main blade 20 is inclined so that its lower edge 16 is forward of the upper end 19. The lower edge 16 is generally parallel to the direction of travel of the knife construction.

A fertilizer tube 26 most commonly used for dispersal of liquid ammonia is attached to the trailing edge 14 of blade 10. This tube 26 may be welded to the trailing edge 14. Optionally, the trailing edge 14 may be undercut as illustrated in phantom by undercut 30 in FIG. 2A for positioning of the tube 26. In either event, a weld bead 32 ahead of the tube 26 is desirably provided to minimize soil wear on the tube 26. Note that the tube 26 is constructed with trailing openings 34 for discharge of the liquid fertilizer.

First and second wings 36 and 38 are welded to the main blade 10 and project transversely. The blades 36 and 38 include leading edges 40 and 42 which are swept back at approximately a 45° angle. The leading edges 40 and 42 are also beveled to a sharp edge. In the preferred embodiment, the bevel is as illustrated from a top surface 44 of wing 40 to a bottom surface 46. The wings 36 and 38 are set back slightly from the leading edge 12. In the embodiment disclosed, this set back is one-eighth inch.

The plane of wings 38 and 40 is also inclined with respect to the leading edge 12. In the embodiment disclosed, this angle of inclination is 130°. The wings 36 and 38 are thus designed to travel through the ground substantially parallel to the soil surface.

The wings 38 and 40 travel through the ground at a depth of two to four inches. The lower edge 16 of main blade 10 travels through the ground in the vicinity of eight to ten inches during normal usage. Of course, these distances may be adjusted depending upon soil conditions and other factors.

Outside edges 48 and 50 of wings 36 and 38 are beveled in a manner similar to leading edges 40 and 42. Outside edges 48 and 50 define the outside tips of the wings 36 and 38. The distance between edges 48 and 50 is in the range of from six to twenty times the thickness of the main blade 10. In the preferred embodiment, the distance between the outside edges 48 and 50 is about fifteen times the thickness of the main blade 10.

Figure 1:
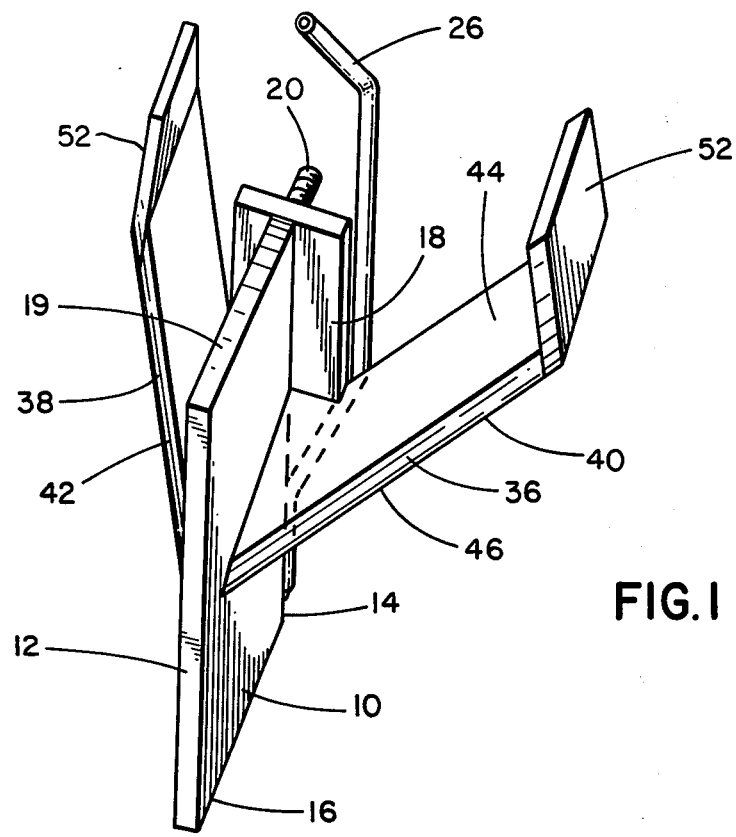
FIG. 1 is a perspective view of the improved knife construction of the present invention.

As an optional feature of the invention, tip members such as tip member 52 in FIG. 1 may be attached to the outside edges 48 and 50. Two tip members 52 would be required to maintain balanced operation of the knife construction. The tip members 52 are generally transverse to the wings 36 and 38 and may extend either above or below the wings 36 and 38.

Various modifications may be made to the knife construction of the present invention. For example, the sweep of the wings 36 and 38 may be adjusted. The distance between the tips 48 and 50 may be altered. The thickness and bevel of the main blade and its leading edge 12 may be altered. Nonetheless, such modifications are to be contemplated as within the scope of the following claims and their equivalents.

What is claimed is:

1. An improved cultivator and liquid fertilizer knife construction for attachment to a shank member, said knife construction comprising, in combination:
   a main knife blade having a leading edge, a trailing edge, a lower edge and an upper end, said blade being inclined relative to the soil surface when in the working position with the lower edge forward of the upper end;
   a fertilizer discharge tube attached at the trailing edge with a trailing discharge outlet adjacent the lower edge;
   a weld bead on the opposite sides of the main knife blade adjacent the discharge tube and forward of the trailing edge for diverting soil from the discharge tube;
   means for attaching the main knife blade to a shank; and
   first and second wings having ouside tips and a leading edge, said wings being uncurved, coplanar and forming an angle of about 130° with the leading edge of the knife blade, said arms extending transversely from the main knife blade on opposite sides and swept back relative to the direction of intended blade travel at an angle of about 45°, said wings being substantially parallel to the surface of soil as it is plowed, the leading edge of said wings being sharply beveled, the dimension of said wings between the outside tips being in the range of about six to twenty times the thickness of the main knife blade.

2. The improved cultivator and liquid fertilizer knife construction of claim 1 wherein the dimension of the wings between the outside tips is about fifteen times the thickness of the main knife blade.

3. The improved construction of claim 1 including a tip member attached to the ouside tip of each of the wings and extending transversely thereto.

4. The construction of claim 1 wherein the trailing edge of the main knife blade includes a recess adjacent the lower edge for receiving the discharge tube.

* * * * *